(12) United States Patent
Benaouda et al.

(10) Patent No.: US 7,774,008 B2
(45) Date of Patent: Aug. 10, 2010

(54) MDN-LESS SMS MESSAGING (NETWORK SOLUTION) FOR WIRELESS M2M APPLICATION

(75) Inventors: Abdelkader Benaouda, Danville, CA (US); Priscilla Lau, Fremont, CA (US); Kwai Yeung Lee, San Jose, CA (US); Xiaomei Wang, Walnut Creek, CA (US); Loc Ba Vo, Pleasant Hill, CA (US)

(73) Assignee: Cellco Partnership, Basking Ridge, NJ (US)

( * ) Notice: Subject to any disclaimer, the term of this patent is extended or adjusted under 35 U.S.C. 154(b) by 846 days.

(21) Appl. No.: 11/643,709

(22) Filed: Dec. 22, 2006

(65) Prior Publication Data

US 2008/0153521 A1 Jun. 26, 2008

(51) Int. Cl.
  *H04W 4/00* (2009.01)
(52) U.S. Cl. .................. 455/466; 455/428; 455/433; 370/349; 370/389
(58) Field of Classification Search ........... 455/433, 455/466, 423, 428, 414.1, 461; 370/328, 370/349, 496, 522, 352–360
See application file for complete search history.

(56) References Cited

U.S. PATENT DOCUMENTS

| | | | |
|---|---|---|---|
| 6,014,089 A | 1/2000 | Tracy et al. | |
| 6,393,297 B1 | 5/2002 | Song | |
| 6,900,737 B1 | 5/2005 | Ardalan et al. | |
| 6,912,389 B2 * | 6/2005 | Bright et al. | 455/433 |
| 6,990,335 B1 | 1/2006 | Shamoon et al. | |
| 7,003,307 B1 | 2/2006 | Kupsh et al. | |
| 2006/0079228 A1 * | 4/2006 | Marsico et al. | 455/433 |

OTHER PUBLICATIONS

International Preliminary Report on Patentability Issued in a corresponding International Application No. PCT/US07/22089 dated on Oct. 17, 2007.

* cited by examiner

*Primary Examiner*—Kamran Afshar
*Assistant Examiner*—Marisol Fahnert
(74) *Attorney, Agent, or Firm*—McDermott Will & Emery LLP

(57) ABSTRACT

Machine-to-Machine (M2M) communications, for various telemetry applications, such as meter reading, alarm applications or the like, utilize data communication service via a public mobile/wireless communication network, such as the short message service (SMS). However, such M2M communications may involve a large number of clients. To avoid the need to assign a telephone number, such as a mobile directory number (MDN) or the like, to each of the many remote M2M clients, routing through the network is based on another type of MSID (Mobile Station Identifier), such as the MIN (Mobile Identifier Number) or the IMSI (International Mobile Station Identifier) of the client. SMS messages transmissions originating at a client use a short code for the M2M application address, and SMS messages intended to terminate at a client use the MIN or IMSI as the routing address for the M2M device.

19 Claims, 4 Drawing Sheets

MDN-LESS SMS MESSAGING (NETWORK SOLUTION) FOR WIRELESS M2M APPLICATION

TECHNICAL FIELD

The present subject matter relates to techniques and equipment to enable machine-to-machine communications via a public mobile/wireless communication network, e.g. for various telemetry applications, meter reading applications, alarm applications or the like, without the need to assign a mobile directory number or other valid telephone number to each of the many remote client devices.

BACKGROUND

In our modern society, there is an increasing trend to deploy Machine-to-Machine (M2M) communications so as to automate a variety of data gathering operations and/or to provide automatic data communications in support of a variety of other automated applications increasingly demanded by consumers and service providers alike. Automated M2M communications, for example, allow utility companies to automatically read utility meters, which eliminates the need for personnel to visit customer premises and manually read meters. M2M communications also are used for alarm reporting and remote control applications. Health monitoring data can be automatically reported as well. Other applications of M2M are being developed all the time as technologies advance. Many M2M communications have utilized the public switched telephone network. However, more recently, M2M communications have begun to use communication services offered by public mobile wireless communication networks, such as operated by cellular and PCS (personal communication service) providers.

M2M applications typically involve communication of a small amount of information between an application server and multiple client devices in the field. The information exchange often is infrequent, occurring on a pre-determined schedule or triggered by infrequent events. However, at such times, the M2M data exchange generally requires near real time wireless delivery end to end. For large scale application deployments, the M2M service provider may require coast to coast wireless network coverage.

There are some present systems that piggy-back on the control channel of an older analog wireless technology for data transmission and stitch together disparate wireless network(s) to provide the required network service. This approach has very low bandwidth capacity, and limits the amount of data that can be exchanged (hence restricting the M2M applications that potentially can be supported).

Wireless carriers have developed a text messaging service known as Short Message Service or "SMS." The SMS service transmits text messages for display on the mobile stations. In a typical implementation, SMS communications to/from a mobile station use a signaling channel over the airlink and use out-of-band signaling resources of the mobile phone network for transport to/from a server platform referred to as a SMSC (Short Message Service Center). The SMSC, for example, receives packet communications containing text messages and forwards the messages via the signaling resources and the signaling channels to the appropriate mobile stations. The SMSC will also receive similar messages from the mobile stations and forward them to servers or terminal devices accessible via an Internet Protocol (IP) packet data network. Recently there have been proposals to provide M2M communications using the SMS service through the public cellular telephone network. Several examples of proposals to use SMS for M2M type applications may be found in U.S. Pat. Nos. 6,014,089; 6,393,297; 6,900,737; and 6,990,335.

Use of the SMS technology meets the small data bandwidth and real-time transmission requirements for M2M communications, and it offers increased capacity over the prior wireless methodologies. Employing SMS also provides a wireless data solution by design. By default, it takes advantage of a nationwide SMS network infrastructure that is fully integrated, already exists and is built upon industry-standard digital wireless technology. However, actual SMS implementation must address some practical issues.

In a public wireless mobile telephone network, including networks that offer the SMS service, each wireless subscriber (whether it be an end-user or an end-device as in the case of M2M) is assigned a valid telephone number, often referred to as a Mobile Directory Number or MDN, which is used as a destination address to terminate call routing for call delivery. The MDN may also be used to identify the subscriber and verify subscription profile information during communications through the network. In developing any new wireless products or services through such a network, the MDN is nearly a mandatory requirement for implementation. However, requiring a MDN-based network service to support M2M applications has many disadvantages and will be impractical and costly to implement.

MDN numbering resources are finite. It has been a continuing challenge to wireless service providers to manage MDN usage as the number of wireless service users grow. M2M devices can potentially grow in magnitudes far beyond today's normal wireless subscriber growth. For large scale M2M applications, the numbers of new client devices can be in the millions per year. Supporting multitudes of devices can substantially add to the burden of a dwindling numbering resource pool.

The regulatory scheme also places strict restrictions on use of the MDN to support the M2M applications. MDN allocation to wireless service providers is subject to wireless number pooling and wireless number portability regulations. Number pooling requires the wireless carriers to apply for MDN blocks, a thousand numbers at a time, and requires the service providers to return a block of numbers to the pool if the utilization factor is low. Number portability allows the subscribers to take the MDN with them when they switch wireless service providers. Such numbering restrictions make it impractical to obtain a large number (millions) of MDNs to use for M2M applications. Also the number portability requirement is generally not applicable to M2M applications because the number is associated with a device and not an individual subscriber.

Hence a need exists for a viable technique to support wireless M2M network services, which will reduce or avoid any or all of the problems outlined above caused by utilizing a unique MDN or other valid telephone number for every M2M client device in order to facilitate the M2M message routing.

SUMMARY

The teachings herein alleviate one or more of the above noted problems with wireless network service for M2M applications. The inventors have recognized that a MDN or the like is not necessary to support the M2M application. With M2M applications, use of the MDN is mainly for terminating the data delivery while other MDN related functions are secondary or can be rendered un-necessary. Hence, wireless operators can benefit from finding a way to support wireless M2M network services without utilizing a valid telephone number, i.e. without a MDN or the like, in the call routing.

The present teachings encompass a variety of machine-to-machine communication techniques. One such technique enables machine-to-machine communication via a data service of a mobile network providing wireless communication services. A data message is received from a machine-to-machine application, for communication through the mobile network to a machine-to-machine device. The received data message includes a mobile station identifier, which is an identifier assigned to a wireless client associated with the machine-to-machine device by an operator of the mobile network. However, the identifier is not a valid telephone number for call routing through the mobile network. The method involves looking up routing information related to current location of the wireless client device, needed for routing through the mobile network to the wireless client device, based on the mobile station identifier included in the received data message. The network communicates the data message to the wireless client, for delivery to the machine-to-machine device, using the routing information.

Another disclosed method of machine-to-machine communication involves receiving a data message over an airlink from a wireless client associated with a machine-to-machine device. In this case, the data message contains a mobile station identifier as a source address and a short code associated with a machine-to-machine application as a destination address. The mobile station identifier is an identifier assigned to the wireless client by an operator of the mobile network, but the identifier is not a valid telephone number for call routing through the mobile network. This method involves communicating the data message, including the mobile station identifier, through the mobile network for transmission to a server hosting the machine-to-machine application associated with the short code.

Another disclosed method of machine-to-machine communication involves two messages. A first short message service (SMS) message is received from a machine-to-machine application. This first message is routed through a mobile network to a wireless client associated with a machine-to-machine device, based on a mobile station identifier contained in the first SMS message. Again, the mobile station identifier is an identifier assigned to the wireless client by an operator of the mobile network but is not a valid telephone number for call routing through the network. The second SMS message is one received from the wireless client associated with the machine-to-machine device. This second SMS message is routed through the mobile network for delivery to the machine-to-machine application, based on a destination address associated with the machine-to-machine application contained in the second SMS message service. However, the second SMS message also contains the mobile station identifier assigned to the wireless client, as a source identifier.

The present teachings also encompass an improvement facilitating machine-to-machine communications via a data service of the network. The network improvement includes a machine-to-machine gateway, a message center and a home location register. The gateway provides a network interface, for receiving data messages from and sending data messages to a machine-to-machine application. The message center provides two-way communication of the messages between the gateway and wireless clients. The home location register provides information regarding point of attachment of each of the wireless clients to the mobile network. Messages from the machine-to-machine application include mobile station identifiers of wireless clients as destination addresses. Messages from the wireless clients contain mobile station identifiers of the wireless clients as source addresses. Each mobile station identifier is assigned to a respective wireless client by an operator of the mobile, but the identifier is not a valid telephone number for call routing through the wireless communication network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In the detailed examples discussed below, M2M communications utilize an intrinsic data communication service of a public mobile/wireless communication network, such as the SMS service. To avoid the need to assign a telephone number, such as a MDN or the like, to each of the many remote M2M clients, routing through the network is based on another type of MSID (Mobile Station Identifier), such as the MIN (Mobile Identifier Number) or the IMSI (International Mobile Station Identifier) which the network operator or carrier can assign to each M2M client. SMS messages transmissions originating at a M2M client use a short code for the M2M application address, and SMS messages intended to terminate at a M2M client use the MSID as the routing address for the M2M device.

Reference now is made in detail to the examples illustrated in the accompanying drawings and discussed below. As noted, the M2M communications use an MSID other than a telephone number, e.g. other than a MDN. For normal mobile stations, the MIN may be the same as the MDN. However, the MIN number may be different from the directory number MDN assigned to the mobile station, for example, in a ported telephone number scenario. The MSID used for the M2M wireless client is not a valid telephone number. Various such MSIDs may be used. Common examples include a MIN and an IMSI. For purposes of discussing a specific example below, we will generally assume that the MSID used is a MIN useless described otherwise.

Figure 1:
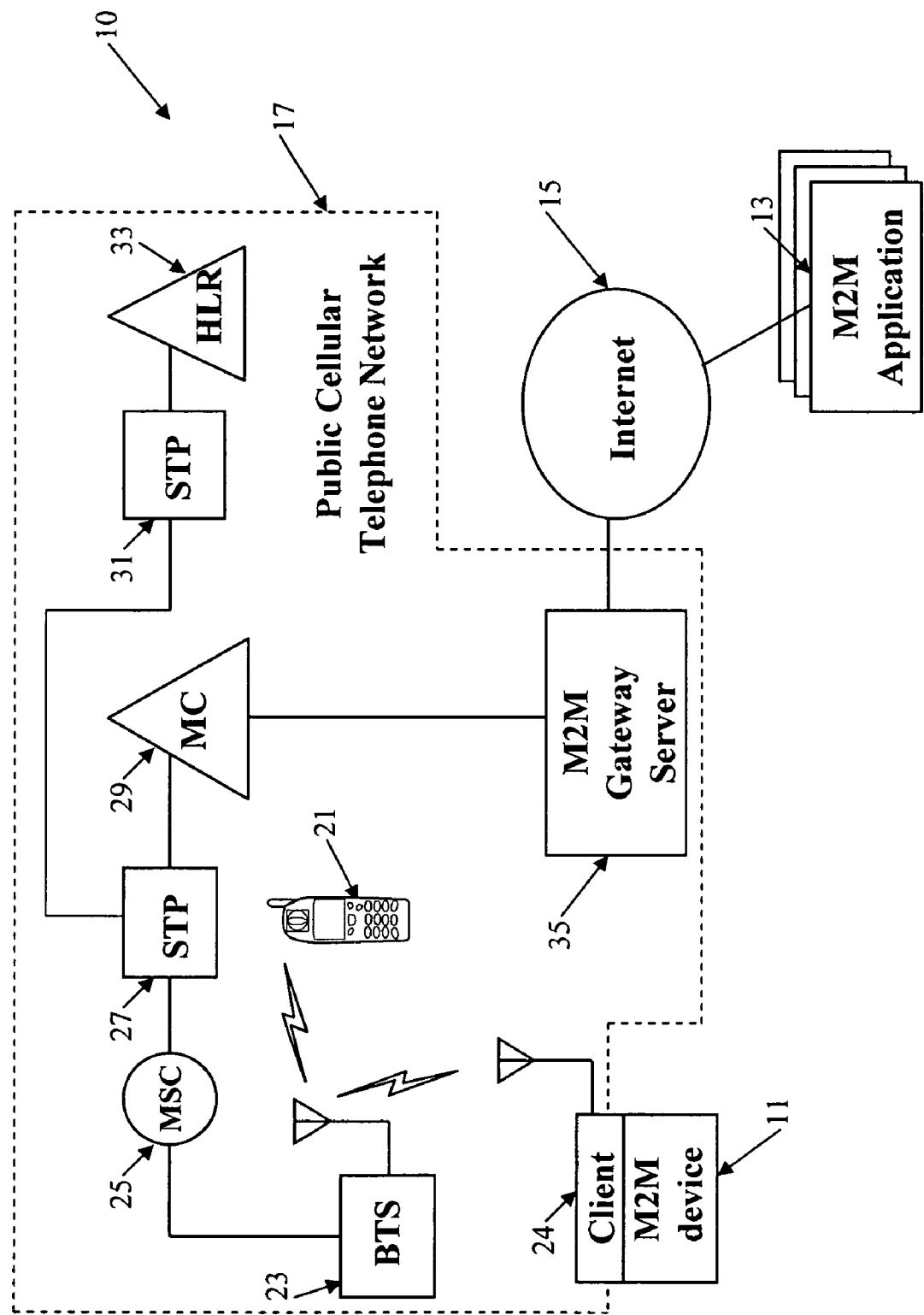
FIG. 1 is a simplified block diagram, showing elements of a public wireless mobile communication network, useful in explaining M2M communications in accord with the present teachings.

FIG. 1 depicts a system 10 providing support for M2M services. Communications for the M2M function extend between a number of M2M devices 11 (one of which appears in the drawing) and one or more M2M applications 13. Each M2M application 13 is an application implemented on a server or host computer, which provides the M2M capability and function of an M2M customer, e.g. meter reading for a utility customer. Other examples of M2M applications include remote control of customer premises equipment, alarm reporting, medical telemetry and the like.

The M2M device 11 is the corresponding remote equipment for performing the relevant function(s). In a utility meter reading example, the M2M device 11 would be the actual meter reader. There would be similar M2M devices 11 at many premises of customers of the utility company, and the application 13 would enable the utility company to obtain and process meter reading data from the many devices 11, e.g. for purposes of billing the customers for their respective utility usage. The M2M devices 11 and the M2M application 13 communicate data via an Internet Protocol (IP) data network, such as the exemplary Internet 15, and a public mobile/wireless communication network shown as a public cellular telephone network 17 in the example.

The mobile network 17 normally provides wireless voice and data communication services to conventional mobile stations, represented by the mobile telephone handset 21. Although the present teachings are applicable to other types of public mobile/wireless networks, for discussion purposes, we will assume that the network 17 is a CDMA (code division multiple access) type digital wireless network, such as an IS-95, cdma2000 or EVDO (Evolution-Data Only) type network. The M2M communications utilize an existing data communication service through the network 17. Although those skilled in the art will be familiar with the structure and operation of such a network 17, it may be helpful to briefly summarize aspects of that network before focusing on the M2M communications.

Physical elements of a radio access network portion of the network 17, operated by one of the many wireless carriers, include a number of base stations represented in the example by the base transceiver systems (BTS) 23. Each BTS 23 communicates via an antennae system and the air-link with one or more of the mobile stations 21, when the mobile stations are within range. A base station typically includes a BTS 23 coupled to several antennae, which are mounted on a radio tower within a coverage area often referred to as a "cell." The BTS 23 is the part of the radio network that sends and receives signals to/from the mobile stations that the base station currently serves. As discussed more later, the BTS 23 similarly provides radio communications for one or more M2M devices 11 within its cell coverage area. For such radio communications, each M2M device 11 has or connects to a compatible wireless transceiver or "client" 24.

The M2M device 11 may be at a fixed remote location, e.g. at a home or apartment or at a commercial/industrial establishment. However, since the M2M communications utilizes services through a mobile wireless network 17, it is also possible to install the M2M on a mobile platform, such as a truck or other vehicle or a package or shipping container. To enable the SMS communications of data for the M2M device 11, each such device 11 will include or connect to a M2M client 24. Logically, the M2M client 24 is an entity resident on the M2M device 11 that provides the SMS network access interface, in this example, to the wireless CDMA digital network 17. Physically this element would be similar to selected components of a mobile telephone station, for example, including the appropriate transceiver components for SMS communication through the network but without the elements for voice input/output and vocoder and transceiver elements for communications of voice information. The client 24 would have a data communication interface to the elements of the M2M device 11 but typically would not include a display or keyboard or the like for user interface purposes.

In the outbound direction, the M2M client 24 receives data for communication, from the associated M2M device 11. The client 24 formulates the data as an SMS message. It originates SMS traffic through the network 17 using the short code for the M2M application address. The client includes its MIN (in this example) as the MSID and places a null value in or leaves empty the field that otherwise would contain an MDN. The M2M client 24 terminates traffic with the MIN for the M2M device 11. The client 24 extracts data from received messages and hands the data off to the associated M2M device 11.

Although shown as a single client 24 for each M2M device 11, those skilled in the art will recognize that some implementations could use one client 24 to provide SMS communications through the network 17 for a plurality of M2M devices. In such an arrangement, the data included in the SMS payloads would include addresses or identifiers of the respective M2M devices served through a particular client 24 identified by its MSID.

A typical current example of the network 17 also includes a number of radio access network switches. The drawing shows one such switch 25. The switches 25 typically are modern versions of mobile telephone switching offices or mobile switching centers (MSCs), which support both cellular voice and packet data services. Each MSC switch 25 connects through trunk circuits to a number of the BTS base station transceivers 23, which the respective switch serves and controls. In a network 17 providing voice telephone services, each MSC switch 25 also typically connects via trunk circuits to the public switched telephone network (not shown).

For call set-up and related signaling and control functions, the exemplary network 17 includes an out of band signaling network, typically in the form of a signaling system 7 (SS7) network. An SS7 network is an interoffice network between switches as well as to and from various control nodes. Routing for SS7 signaling is provided by packet switches referred to as signaling transfer points (STPs), typically implemented as mated pairs, although they are shown as individual nodes in the drawing for simplicity. As discussed more below, two such STPs are shown. Of note for purposes of this discussion, the STP 27 provides a signaling communication link from the MSC 25 to a messaging center (MC) 29 for the M2M service, and the STP 27 and an STP 31 provides a signaling link between the MC 29 and a home location register (HLR) 33. As discussed more, later, the MC 29 is similar to a normal SMSC except that the MC 29 is configured to query the HLR and to route messages based on MSID rather than MDN. Similarly, the HLR 33 is configured to use MSID instead of doing its look-up based on MDN. Other SS7 links/STPs, such as those between MSC switches 29 and between the switches and the HLR 29 are omitted here for convenience.

To control service authorization and provide programmed control for certain advanced service features, the carrier operating the wireless network 17 also operates a home location register (HLR) 33 that stores subscriber profiles and related call processing control information for each of that carrier's wireless subscribers and their associated mobile stations 21. Of note for purposes of this discussion, the HLR 33 also stores relevant profiles or service control records, for the client communication devices 24 for the M2M devices 11. The HLR 33 may reside in the home MSC, however, in the example, the HLR 33 resides in a centralized node sometimes referred to as a service control point (SCP).

The HLR 33 communicates with the MSCs 25 via data links and one or more of the STPs. For SMS services, the HLR 33 also communicates with SMS message centers via the STPs. Hence, for the SMS service in support of the M2M communications, the HLR 33 communicates with the MC 29 through one or more STPs 31.

As recognized in the art, an HLR stores for each mobile subscriber station 21 the subscriber's mobile directory number (MDN), the MIN, and information specifying the wireless services subscribed to by the mobile subscriber, such as voice service features, SMS, mobile web access, etc. As will be discussed below, one aspect of normal HLR processing of an incoming voice or SMS call involves translation of the MDN associated with the call into the MIN, for use in completing the call to the mobile station 21. For each mobile station 21, the HLR also stores data identifying the current point of attachment of the mobile station to the network. In a network of the type shown, the information identifies the MSC 25 at which the mobile station 21 most recently registered, for example, by the SS7 point code or other form of address for that MSC 25. The network uses the MSC address information to route the voice or SMS call through to the mobile station 21 at its current location. The HLR 33 will store similar records for the wireless clients 24 associated with the M2M devices 11, although the records will not translate a MDN into a MIN, as the records for such devices 11, 24 do not have associated MDNs.

Wireless carriers developed the short message service (SMS) to transmit text messages for display on the mobile stations. In many existing network architectures, the SMS traffic uses the signaling portion of the network 17, through the STPs and the like. SMS traffic normally goes to/from a SMSC (Short Message Service Center). The STPs provide communications between the SMSCs and the MSCs as well as between the SMSCs and the HLR. In a similar fashion, for the M2M communications, the network 17 includes a MC (message center) 29. The MC 29 is essentially a SMSC that has been programmed so as to provide specific functions to support the MDN-less SMS routing scheme. The STPs 27 and 31 provide signaling communication links to a short message service center type platform, which is configured to implement the functions of the MC 29.

The MC 29 implements SMS messaging functions, but without the need to reference the MDN in the routing operations. Hence, for device terminating SMS M2M message traffic, the MC 29 eliminates the use of the MDN in SMS messaging (via SMDPP). For traffic terminating at a M2M client 24, the SMS messaging (via SMSREQ, SMDPP) either will not include the MDN or will include the MDN with a null value. The MC 29 will base its processing of the terminating traffic on a different mobile station identifier (MSID) included in the terminating messages. The MSID could be an IMSI or similar identifier, but in this example, it is a MIN.

Each server hosting a M2M application 13 is assigned a short code. Hence, the MC 29 routes outgoing messages using a short code for the destination address of the M2M application. A short code for SMS is a digit string that is not a telephone number which is typically 7 digits or 10 digits. For example, a short code can be a 4-digit, a 5-digit, a 6-digit, an 8-digit string or a 12-digit string.

The MC 29 communicates with external customer equipment, typically computers hosting the M2M applications 13, via an IP network, in this case the public Internet 15. To provide the interface for M2M communications, the network 17 includes a M2M gateway server 35. The gateway server 35 communicates with the MC 29 via an internal IP link or network, and the gateway server 35 communicates with the public Internet 15. The M2M gateway server 35 allows the MC 29 to receive and send messages in IP packet format. The M2M gateway server 35 is an entity within the wireless network 17 that acts as an intermediary between the wireless service provider network and the customers' M2M application server network. For example, the gateway server 35 converts messages in protocol(s) used by the M2M applications 13, e.g. Extensible Markup Language (XML), Hypertext Mail Protocol (HTMP), etc., to and from the SMPP protocol. The SMPP messages ride on IP transport, e.g. between the gateway 35 and the MC 29.

MDN is the telephone number of each mobile station 21 served through the cellular telephone network 17. Voice calls to the mobile station 21 use the MDN as a destination address. Normally, SMS text messages intended for a mobile station 21 also use the station's MDN as a destination address. For outgoing calls from a mobile station 21 as well as for SMS text messages originating at a mobile station 21, the MDN of the sending station is used during procedures to authenticate the mobile station 21 and/or to determine if the mobile station subscriber is authorized to use the particular service through the network 17.

A mobile station 21 registers with the network 17, and the network 17 authenticates the mobile station 21, e.g. to check that the mobile station has a valid device number—MIN or IMSI. In a typical implementation, the mobile station 21 attempts to register with an MSC 25 through a BTS 23, and in response, the MSC 25 communicates through an appropriate STP with the HLR that maintains the record for the respective station 21 to authenticate the mobile station 21. At that time, the MSC 25 will also assign a visitor location register (VLR) to the mobile station 21 and temporarily store service profile information for that station in the assigned VLR. The signaling communication between the MSC 25 and the HLR enables the HLR to update the stored location information for the respective mobile station in the associated profile record to indicate the mobile station's current point of attachment to the network, for use in directing subsequent incoming calls to the mobile station 21 through the MSC 25 that is currently serving that particular mobile station. The HLR for the mobile station may be the HLR 33.

The M2M client 24 registers on the network 17 using the MIN in a relatively normal manner. Like a mobile station 21, the client 24 registers with an MSC 25 through a BTS 23, and the MSC 25 communicates through an appropriate STP with the HLR 33 that stores the profile for that M2M client, so as to authenticate that client as a valid station permitted to communicate through the network 17. The HLR 33 will store the point code or other form of address of MSC 25 as the serving MSC address for the M2M client 24. The MSC 25 will also assign a visitor location register (VLR) to the client 24 and temporarily store service profile information for that client in the assigned VLR. Once registered, the M2M client 24 can send and receive SMS messages through the network 17, for the associated M2M device 11.

If the M2M device 11 roams, the client 24 from time to time will re-register in a similar fashion, but through different MSCs 25. Each registration signaling communication enables the HLR 33 to update the stored location information for the respective client 24 in the associated profile record, to reflect the current point of attachment of the client 24 to the network 17. The stored information indicates the MSC at which the client most recently registered. Routing of an inbound SMS message to the M2M device 11 involves a communication between the MC 29 and the HLR 33 to obtain the current location information for the respective client 24, similar to that for an in-bound voice call or an in-bound SMS call to a regular mobile station 21.

The exemplary solution applies SMS messaging to enable data delivery for wireless M2M applications. However, the SMS solution discussed herein does not utilize the MDN but relies solely on the MIN as the MSID in the actual SMS messages routing. The MSID, in the example a MIN, is not a valid telephone number and thus is not subject to the number pooling and number portability regulations. Also, it does not require assignment of scarce telephony numbering resources.

An SMS message includes source and destination address fields. For messages from a user device, the source address normally is the MDN of the sending customer's mobile station. The destination address may be a MDN of a destination station or some other form of recognizable address. Of note for purposes of this discussion, one type of alternative address is a short code, typically four, five, six, eight, or twelve digits. The network routes a SMS message with a MDN destination address all the way through to the addressed mobile station. The network routes a SMS message with a short code destination address to a service provider application corresponding to the short code. Depending on the service, the application may process the message, e.g. to count votes; or the network application may translate the short code to a destination address, e.g. an IP address of a customer's server.

SMS routing thus allows use of short codes as a mechanism to route messages to/from a service provider, as opposed to communication of messages between end user devices. For this purpose, the short code is recognized by a control application as being a message to a service provider as opposed to a message between SMS user devices, and the control application translates the short code to direct the message to the appropriate service provider platform.

For the M2M application, the M2M client will not have a MDN. However, the device will still have a MSID (Mobile Station Identifier) assigned by the network operator. The MSID may be a MIN or an IMSI, or it may take another form. As a result, messages going to or from the M2M device 11, via the M2M client 24, will not have a MDN. However, they will still contain the MSID. The MSID may look like a telephone number, e.g. if it is a 10-digit MIN. However, the MSID will not be a valid mobile telephone number. For a message directed to a M2M client 24, the network will route the message based on the MSID. For a SMS message from a M2M client 24, the network will route the message based on a short code associated with the appropriate M2M application 13.

For an outgoing SMS message from a mobile station 21, the message includes a source address comprising a field for normal telephone number and a field for another device identifier assigned by the network operator. In a typical SMS communication from a mobile station 21, the telephone number is the MDN whereas the other identifier is a MIN or IMSI. For the M2M related service, the telephone number address field for a message from a M2M client 24 will be empty or will contain a null value, although the other identifier field would still contain the MIN or IMSI.

For SMS messages originating at a mobile station 21, the MSC 25 determines where to route the message, typically to one of several SMSCs deployed in the network 17. The MSC makes that determination based on the MIN of the sending device. Essentially, the MSC looks up the point code or other form of address for the appropriate SMSC based on the MIN of the sending mobile station 21 contained in the received SMS message. In a similar fashion, the MSC 25 will translate the MIN of a sending client 24 based on the MIN of the client 24 in the source field of the SMS message received over the airlink from that client.

As discussed above, the destination address of a SMS message usually contains a directory number or other full address of the destination, or the destination address field contains a predefined short code. In a normal operation for a SMS transmission to a mobile station 21, an SMSC receives the message containing the MDN of the destination station 21 and queries the particular HLR that stores the record associated with that station's MDN for information about the mobile station 21 that is needed to route the message to the mobile station at its current location. The HLR responds by providing the routing information, typically the MIN of the mobile station 21 and a SS7 point code or other form of address for the MSC 25 where the mobile station 21 was last registered. The SMSC uses the information to signal the MSC that last registered the mobile station (based on the point code or other form of address of the MSC), and the MSC uses the MIN to page the mobile station 21.

In the M2M communication, the SMS message from the M2M application 13 will not have a MDN for the M2M client 24. Instead, the SMS message will contain the MIN that the network operator has assigned to the particular M2M client 24. The MC 29 will query an HLR, much like an SMSC does in the normal SMS service. However, MC 29 will use the MIN to query HLR 33. In turn, the HLR 33 will look for the point code or other form of address of the MSC 25 currently serving the M2M client 24, based on the MIN (instead of an MDN).

Figure 2:
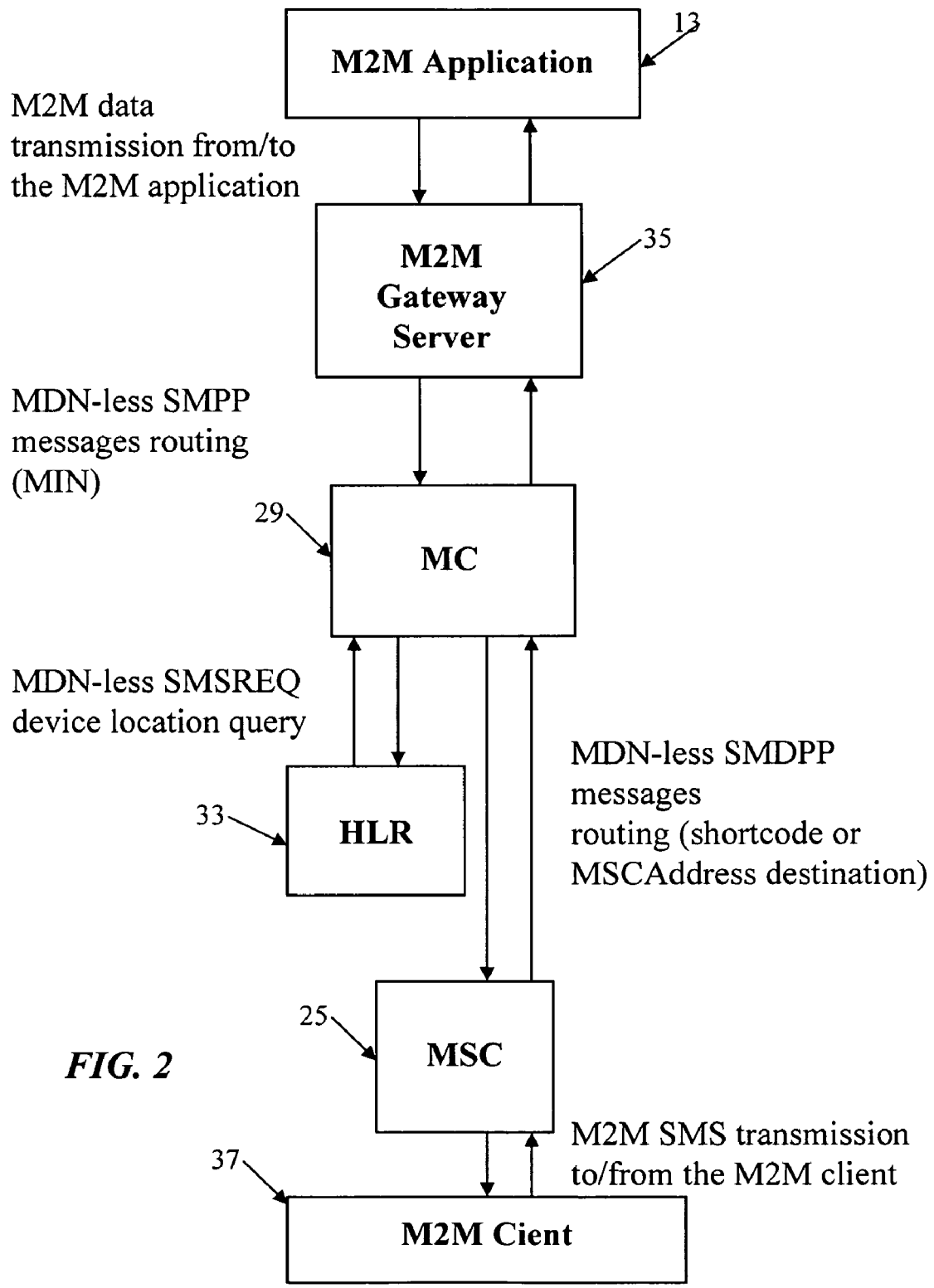
FIG. 2 is an alternative block diagram, showing communication, relationships between elements of the network of FIG. 1 involved in M2M communications through the network.

FIG. 2 shows communication relationships between elements of the network 17 of FIG. 1, as they are involved in M2M communications through the network. The M2M application 13 is an application implemented on a server or host computer, which provides the central M2M capability and function of an M2M customer. The M2M application 13 communicates data using a standard protocol, although it need not be a protocol like SMPP specifically adapted to SMS.

The M2M gateway server 35 is the interface between the wireless service provider network 17 and the M2M customer application 13. The M2M gateway server 35 acts as a processing and distribution point for the wireless M2M data. The interfaces from the M2M gateway 35 to the M2M application 13 can be a modified SMPP or other IP based protocols. The interface from the M2M gateway 35 to the SMS network can be the modified SMPP protocol. The modification to the SMPP protocol, in the example, is to use MIN instead of the MDN in the source address and/or the destination address parameters.

The gateway 35 takes inbound messages from the M2M application 13 including the originating short code (as identifier to the M2M application 13), destination MIN (as a MSID type identifier to the M2M device 11) and the M2M data. The gateway 35 maps the original M2M data into SMS messages and then funnels the M2M SMS traffic from the M2M applications to M2M devices. In this way, the gateway server 35 transmits M2M data into the service provider's SMS network to the device 11 on behalf of the M2M customer applications 13. For messages going from the M2M devices 11 to the M2M application 13, the M2M gateway server 35 is the traffic concentrator and determines the particular customer application 13 to which traffic is destined from the devices 11. The gateway 35 pulls M2M data from the SMS packet payload and passes it over to the appropriate M2M application 13 that resides on the M2M customer network.

The interface from the MC 29 to the M2M gateway 35 supports a modified SMPP protocol, which rides on IP packet transport between the gateway 35 and the MC 29. The interface from the MC 29 to the SMS network supports IS-637 and ANSI-41 with some modifications. The modifications to the SMPP, IS-637 and ANSI-41 protocols allow the MC 29 to support routing of SMS messages using only MIN but not MDN. The MC 29 does not include the MDN in the SMDPP invoke and SMSREQ request. For messages from the device 11 to the M2M application 13, the origination address will not be included or included with a value of null (SMS_OriginalOriginatingAddress=null). Whereas for messages from the M2M application server 13 to the M2M device 11, the SMDPP message destination addresses will not be included or included with a null value (of SMS_OriginalDestinationAddress=null). All routing processing is based on the use of only the MIN (of the device).

In the example, one or more message centers MCs 29 are deployed for M2M traffic. Regular SMSCs (not shown) would still handle SMS text message traffic in the normal manner. The M2M gateway server 35 provides an interface to an IP network, to allow one or more customers' M2M applications 13 to interface to the wireless networks. The M2M short codes will cause the network 17 to route outbound M2M messages to this gateway 35, for distribution to the respective M2M application servers 13.

Today when an SMSC routes a SMS message (in SMPP) to a gateway and to an outside application server, the outgoing message contains the MDN as the source address (but not the MIN or other network assigned MSID). In the M2M application, the outgoing message from the MC 29 will contain the relevant MSID (e.g. MIN or IMSI) as the source identification/address. Normal SMPP message uses MDN in the source field, whereas now the outbound SMPP messages from the MC 29 will include MIN in the source field.

The M2M gateway server 35 is similar to existing gateways used for other SMS traffic, such as e-mail and/or voting traffic. However, the M2M gateway 35 would be configured to receive messages destined for devices identified with MINs (instead of MDNs) and propagate the MINs into the destination address fields of the SMPP invoke messages that normally would contain MDNs. The MC 29 will recognize SMPP invoke messages from the M2M gateway 35 as messages related to the M2M communications and process them accordingly, e.g. by using MINs from the destination address fields for its further processing.

For the present M2M communication solution, the MSC 25 supports generating the SMDPP without inclusion of origination address or with a null-valued origination address (SMS_OriginalOriginatingAddress=null). When the MSC 25 queries the VLR for the M2M device's subscription profile, a null-valued MDN should be returned and subsequently be included in the SMDPP message. The MSC 25 will support SMSNotification with only the MIN but not the optional MDN.

The Home Location Register (HLR) 33 may be implemented as a dedicated HLR, to support querying the device's location via SMSREQ messages without the use of the MDN. Alternatively, the HLR may be shared with other services but configured to distinguish the MDN-less signaling messages for MIN-based processing, e.g. in response to a particular null value in the MDN field of the M2M related signaling messages. For such messages, the HLR 33 will support SMSREQ query processing based on the MIN but not the MDN, and the HLR 33 will support SMSNotification with only the MIN but not the optional MDN.

M2M does not require any voice communications, only data. Also, the amount of data communicated at any one time tends to be relatively small, e.g. no multimedia information. A SMS message carries up to 160 characters of text or an equivalent amount of data, in this case for the M2M service. Typically, an outbound M2M data message from a M2M device 11 will relate to a parameter reading, e.g. from a utility meter or other telemetry device. Typically, an inbound M2M data message directed to a M2M device 11 will relate to a command or control information, e.g. to direct a M2M device to take a reading or perform a remote control function.

Typically, the M2M device 11 will communicate with a server 13 of a particular M2M customer, e.g. a particular utility company for a utility meter reading application. However, the M2M device 11 may communicate with some number of such servers 13. For example, a large M2M customer may have a number of servers to handle a large volume of its communications. In some cases, the device 11 may also communicate with servers of two or more parties, e.g. where one M2M device provides meter readings for a number of utilities and/or receives remote control commands from one or more other parties. Medical telemetry applications may involve communications with a number of different computers, e.g. of doctors, labs, insurance carriers and/or hospital personnel. Each such application server 13 would have its own assigned short code, for SMS message addressing purposes.

The MC 29 will accumulate message records, for billing or the like. Here, the records would likely be based on the M2M application 13, e.g. matching the short code in the respective message. The data, however, would also include the MIN of the destination client. Typically, the carrier will process these records to bill each M2M customer for the aggregated SMS message traffic to/from the particular customer's application(s) 13. The network operator may also offer call detail records to the M2M customer, e.g. showing individual message communications to/from the various M2M devices 11.

In the illustrated example, servers such as the MC 29, the M2M gateway server 35 and the server hosting the M2M application 13 are intended to represent a general class of data processing device commonly used to run 'server' programming. Each such device typically runs a general server type program and one or more application programs on top of the server programming, to implement the respective functionality. Such a device typically utilizes general purpose computer hardware to perform its respective server processing and to perform the attendant communications via the network(s). Each server for example includes a data communication interface for packet data communication, and the server implementing the MC 29 further includes interfaces to SS7 links to the appropriate STPs 27, 31. Each server also includes a central processing unit (CPU), in the form of one or more processors, for executing program instructions. The server platform also includes program storage and data storage for various data files to be processed and/or communicated by the particular server. The hardware elements operating systems and programming languages of such servers are conventional in nature, and it is presumed that those skilled in the art are adequately familiar therewith.

Figure 3:
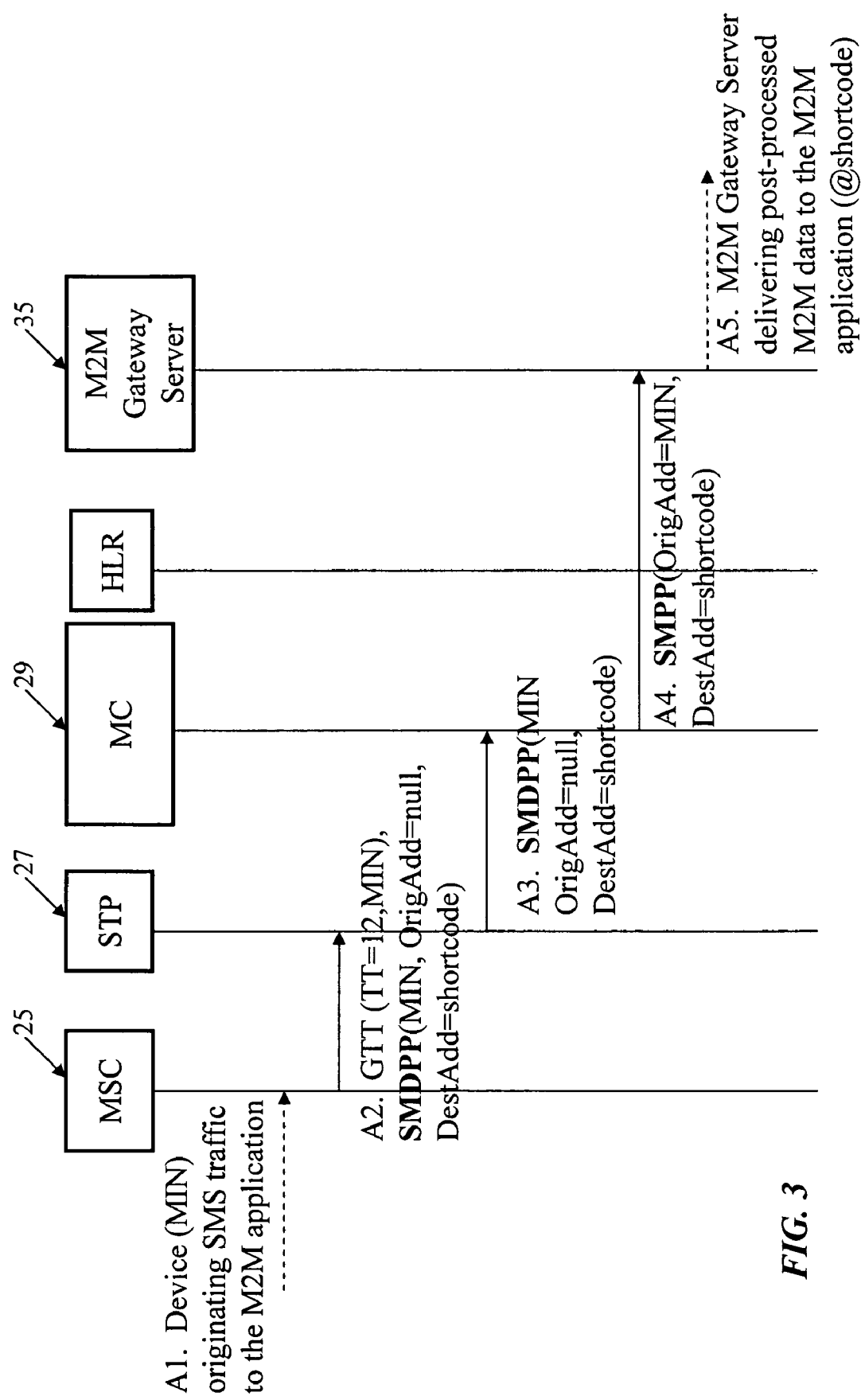
FIG. 3 is a signal flow diagram of a SMS message communication call, originating at a wireless client and addressed to a server for the M2M application.

FIG. 3 is a signal flow diagram of an outbound SMS message communication call, originating at a client device 11 and addressed to a server for a M2M application 13. For convenience, the M2M device 11, the client 24 and the M2M application 13 are omitted and communications to/from the device and application are shown by dotted line arrows.

In step A1, the M2M device 11 originates a SMS data exchange to the M2M application server 13. The client 24 of device 11 utilizes SMS messaging to transmit data to the M2M application 13 over the CDMA network 17. The client 24 is assigned a MSID (only) and has no MDN address, whereas the M2M application 13 of interest is addressed with a designated short code. Hence, the M2M device 11 hands the data message to the client 24, and the client formulates an appropriate SMS message containing that data. The SMS message includes the short code of the M2M application 13 in its destination field, and the SMS message includes the MIN in the appropriate field as the source identifier. The client 24 transmits the SMS message over the signaling channel on the access channel or the traffic channel of the airlink to the antenna and BTS 23 at the serving base station, which in turn forwards the message to the MSC 25 (receipt at the MSC shown at step A1 in the drawing).

In step A2, when the SMS message arrives at the MSC 25, the MSC 25 that is serving the M2M device 11 in turn issues a SMDPP invoke message which carries the M2M data in the SMS payload. This SMDPP invoke message has no source telephone address (SMS_OriginalOriginatingAddress is not included or included with a value of null), and uses the application's short code as the destination address (SMS_OriginalDestinationAddress). The MSC 25 will specify the message to be routed using GTT (Global Title Translation) with TT (Translation Type)=12.

The MSC 25 sends the SMDPP invoke message to the STP 27, as shown at A2. The SMS routing normally uses GTT (Global Title Translation) to translate MIN of the mobile station into a SS7 type point code for routing a SMS message from the mobile station 21 to an SMSC. The routing for the outbound M2M type SMS message is similar to that for a normal SMS message from a mobile station, in that it relies on GTT. For M2M, the GTT translation translates the MIN of the client device 24 into the SS7 point code for the MC 29. Hence, the MSC includes a GTT TT=12 value in the SMDPP invoke message it sends to the STP 27. In step A3, the STP 27 resolves the GTT TT=12 with the given MIN (of the M2M device) to the point code of the M2M MC 29. Based on the translation result, the STP 27 routes the SMDPP invoke message to the M2M MC 29.

In step A4, the MC 29 recognizes that the SMDPP invoke message contains data destined to a particular M2M application 13 from the short code (destAdd=short code). The MC 29 formulates the data into an SMPP message and routes it to the M2M gateway server 35 over the private IP interconnection. The SMPP message contains the application short code as a destination address. The SMPP contains the MIN in the origination address field. In step A5, upon receiving the SMPP message, the M2M gateway server 35 processes the message, performs any necessary protocol conversion, and delivers the M2M data to the destined M2M application server 13 via the Internet 15.

Figure 4:
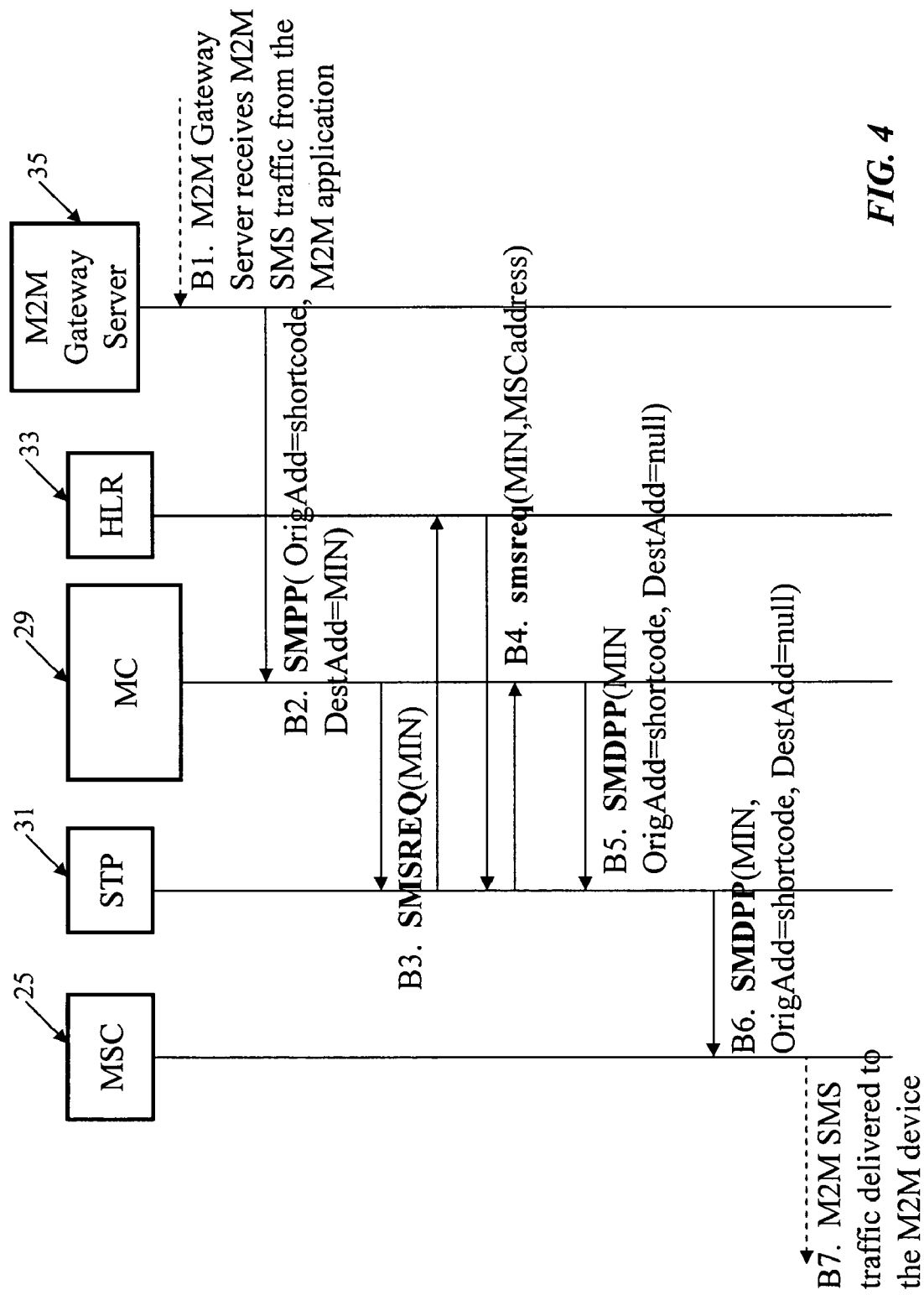
FIG. 4 is a signal flow diagram of a SMS message communication call, from a server for the M2M application addressed to a wireless client associated with an M2M device.

FIG. 4 is a signal flow diagram of a SMS message communication call, from a server for the M2M application 13 addressed to a M2M device 11 through a client 24. Again, for convenience, the M2M device 11, the client 24 and the M2M application 13 are omitted and communications to/from the device and application are shown by dotted line arrows.

The M2M application server 13 (FIG. 1) sends a message through the Internet or other IP network to the M2M gateway server 35, in an agreed upon protocol that the server 35 is configured to handle. Hence, in the example, at step B1, the M2M gateway server 35 receives data from the M2M application server 13 that the gateway 35 needs to transmit to the M2M device 11. The incoming message may be similar to a message for other incoming SMS traffic, except that for the M2M communications, the destination identifier is the MSID of the M2M client 24 (not a valid telephone number such as MDN). The source identifier portion of the message will include a short code for the M2M application on the server 13.

In response, the gateway 35 starts the SMS data exchange. In step B2, the M2M gateway server 35 issues a SMPP submit_sm message or a SMPP data_sm message with the M2M data in the payload. The gateway 35 sends the SMPP message to the M2M MC 29, over the IP interconnection. The M2M MC 29 converts the SMPP message into the SMDPP invoke message. The SMDPP invoke message has only the MIN of the M2M device as the destination address. The source address has the short code to identify the originating M2M application.

Like a mobile station 21, when the client 24 is ON, it registers with an MSC 25 through a BTS 23. If the M2M device 11 roams, the client 24 from time to time will re-register through a different MSC 25. Each new MSC 25 with which the client 24 registers will in turn communicate through an appropriate STP with the HLR 33. This signaling communication allows the MSC to authenticate a mobile station; in this case the wireless client 24; and it enables the HLR 33 to update the stored location information for the respective client 24 in the associated profile record. Routing of the in-bound message to the M2M device 11 (FIG. 4) involves a query by the MC 29 to the HLR 33 to obtain the current location information for the respective client 24, similar to that for in-bound voice calls or in-bound SMS calls to a regular mobile station 21.

Hence, in step B3, the MC 29 sends a query to the HLR 33 through the STP 31. The query takes the form of a SMSREQ type message. The SMSREQ type message, in this case, includes the MIN as the identifier. For regular SMS, under the LNP environment, the SMSREQ type query message to the HLR 33 includes a MDN field. However, for the M2M communications, the MDN field will be empty or contain a null value of a type recognizable by the HLR. The HLR 33 will be programmed to respond to such a message by using the MIN for its lookup function (instead of the MDN in the regular SMS processing). Hence, in response to the SMSREQ query regarding the M2M type SMS message, the HLR 33 utilizes the MIN to access the appropriate record in its database and obtain the point code or other form of address of the MSC 25 serving the location of M2M device 11, that is to say the last MSC 25 with which the device client 24 has registered. Once found, the HLR 33 formulates a smsreq response with the MSC point code or other form of address (SMS_Address=MSCAddress) along with the device's MIN. In step B4, the HLR 33 responds back to the MC 29 with the smsreq response, which it sends to the MC 29 through the STP 31.

In step B5, subsequently the MC 29 uses the MSCAddress (point code or other form of address of the serving MSC 25) to send a SMDPP invoke message to the STP 27, which forwards the message to the serving MSC 25 in step B6. This message carries the M2M data in the payload. The SMDPP message includes the MIN, and it includes the short code as the origination address. However, the destination address contains a null value (instead of a MDN). In step B7, the MSC 25 uses the MIN to page and deliver the SMS message to the client 24, which in turn delivers the payload data to the M2M device 11. Although not used for routing, the origination address will be included, in this case the short code for the M2M application 13.

In the example of FIGS. 3 and 4, the MSID used for the M2M communications was a MIN. A MIN is a 10-digit number similar to a MDN; but unlike a MDN, the MIN is not a valid telephone number. As noted, the MSID may use other types of identifiers, such as an IMSI. The MSID may be any identifier that can be assigned in volume to the M2M clients 24, which is not itself a valid telephone number. In the current protocols, the fields that carry the MSID can carry up to 15 digits, however, the protocols could be extended to use larger identifiers. Typically, the MSID will be a numeric string, although alphabetic characters could be used or included.

A number of benefits can be achieved by implementing the M2M communications through the network 17, in the manner outlined above in the specific examples. For example, no MDN numbering resources will be needed to support SMS communications for the M2M applications. The MDN-less scheme can sustain a potentially huge M2M subscription base (M2M devices in the millions). Hence, MDN resource limitations will not hinder wireless M2M growth. Also, the SMS communications for M2M without MDN offers a scalable solution. It minimizes numbering resources impacts by not consuming any MDN resources (which are always contentious and must be shared among service providers for developing new services).

Also, changes to existing SMS network infrastructure are minimal. This wireless M2M architecture leverages an existing and stable SMS infrastructure to provide delivery of M2M data for telemetry or the like. The M2M gateway server is the only new network element added, and it can be implemented in a manner similar to gateways deployed for other SMS based services. The M2M gateway server centralizes management and offers dedicated specialized functions for the M2M application. This architecture allows service providers to implement a short time-to-market solution that is customized for this particular market segment of wireless network services.

The MDN-less approach to M2M communication reuses a well established and widely deployed technology, SMS messaging, to achieve economy of scale and provide a cost-effective implementation of the wireless M2M network service.

As a result, the wireless service provider can offer M2M customers the desired service without consuming a huge amount of MDN numbering resources (avoiding impacts to the wireless community), and meanwhile delivering an economical quick time-to-market network solution for a rapidly growing M2M market segment.

Although the exemplary implementation achieves such advantages, those skilled in the art will recognize that the wireless M2M communications, without MDN or the like, can be implemented in a number of other ways and/or using other wireless network technologies. Alternate implementations will still achieve advantages over other wireless M2M technologies.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

CDMA—Code Division Multiple Access
EVDO—Evolution-Data Only
GTT—Global Title Translation
HLR—Home Location Register
HTMP—Hypertext Mail Protocol
IMSI—International Mobile Station Identifier
IP—Internet Protocol
ISDN—Integrated Services Digital Network
LNP—Local Number Portability
M2M—Machine to Machine
MC—Message Center
MDN—Mobile Directory Number
MIN—Mobile Identification Number
MSID—Mobile Station Identifier
MSC—Mobile Switching Center
PCS—Personal Communication Service
SCP—Service Control Point
SMS—Short Message Service
SMSC—Short Message Service Center
SMSREQ—SMSrequest
smsreq—SMSrequest return result
SMDPP—SMS Delivery Point-To-Point
SMPP—Short Message Peer-to-Peer Protocol
SS7—Signaling System 7
TT—Translation Type
VLR—Visitor Location Register
XML—Extensible Markup Language

What is claimed is:

1. A method of machine-to-machine communication via a short messaging service (SMS) of a mobile network providing wireless communication services, the method comprising:
   receiving a data message from a machine-to-machine application, for communication through the mobile network to an automated machine-to-machine device, the received data message including a mobile station identifier,
   wherein the mobile station identifier is an identifier assigned to a wireless client associated with the automated machine-to-machine device by an operator of the mobile network but is not a valid telephone number for routing through the mobile network;
   looking up routing information related to current location of the wireless client device, needed for routing through the mobile network to the wireless client device, based on the mobile station identifier included in the received data message; and
   transmitting the data message as a SMS message through the mobile network and over a wireless airlink to the wireless client, for delivery to the automated machine-to-machine device, using the routing information, wherein a destination address field of the SMS message, for a valid telephone number normally required for SMS message routing through the mobile network, is empty or contains a null value.

2. The method of claim 1, wherein the mobile station identifier comprises a Mobile Identification Number (MIN) or an International Mobile Station Identifier (IMSI).

3. The method of claim 1, wherein the transmitting of the SMS message through the mobile network comprises:
formatting the data message as a Short Message Peer-to-Peer Protocol (SMPP) message;
routing the SMPP message to a message center based on the mobile station identifier;
based on the SMPP message, formatting the data message as a SMS Delivery Point-To-Point (SMDPP) message; and
routing the SMDPP message from the message center to a switch serving the wireless client, for the transmission of the data message over the airlink to the wireless client, using the routing information.

4. A method of machine-to-machine communication via a short messaging service (SMS) of a mobile network providing wireless communication services, the method comprising:
receiving a data message in the form of a SMS message over an airlink from a wireless client associated with an automated machine-to-machine device, the data message containing a mobile station identifier and a short code associated with a machine-to-machine application as a destination address, wherein:
the mobile station identifier is an identifier assigned to the wireless client by an operator of the mobile network but is not a valid telephone number for routing through the mobile network, and
a source address field of the SMS message, for a valid telephone number, is empty or contains a null value; and
communicating the data message including the mobile station identifier through the mobile network for transmission to a server hosting the machine-to-machine application associated with the short code.

5. The method of claim 4, wherein the mobile station identifier comprises a Mobile Identification Number (MIN) or an International Mobile Station Identifier (IMSI).

6. The method of claim 4, wherein the communicating of the data message through the mobile network comprises:
formatting the data message as a SMS Delivery Point-To-Point (SMDPP) message;
routing the SMDPP message to a message center in response to the mobile station identifier;
based on the SMDPP message, formatting the data message as a Short Message Peer-to-Peer Protocol (SMPP) message;
routing the SMPP message to a gateway server, for the transmission to the server hosting the machine-to-machine application.

7. A machine-to-machine communication method, comprising:
routing a first short message service (SMS) message received from a machine-to-machine application through a mobile network to a wireless client associated with a machine-to-machine device, based on a mobile station identifier contained in the first SMS message, wherein:
the mobile station identifier is an identifier assigned to the wireless client by an operator of the mobile network but is not a valid telephone number for routing through the mobile network, and
a destination address field of the first SMS message, for a valid telephone number normally required for SMS message routing through the mobile network, is empty or contains a null value; and
routing a second SMS message from the wireless client associated with the automated machine-to-machine device through the mobile network for delivery to the machine-to-machine application, based on a destination address associated with the machine-to-machine application contained in the second SMS message service, wherein:
the second SMS message further contains the mobile station identifier assigned to the wireless client, and
a source address field of the second SMS message, for a valid telephone number, is empty or contains a null value.

8. The method of claim 7, wherein destination address associated with the machine-to-machine application is a short code.

9. The method of claim 7, wherein the mobile station identifier assigned to the wireless client comprises a Mobile Identification Number (MIN) or an International Mobile Station Identifier (IMSI).

10. The method of claim 7, wherein the routing of the first SMS message comprises:
receiving a first data message from the machine-to-machine application;
formatting the first data message as a Short Message Peer-to-Peer Protocol (SMPP) message;
routing the SMPP message to a message center based on the mobile station identifier;
based on the SMPP message, formatting the first data message as a SMS Delivery Point-To-Point (SMDPP) message;
routing the SMDPP message from the message center to a switch serving the wireless client; and
based on the SMDPP message, formulating and transmitting the first SMS message over an airlink to the wireless client.

11. The method of claim 10, wherein the routing of the SMDPP message from the message center to the switch serving the wireless client comprises:
obtaining information for routing to the switch serving the wireless client from among information for routing to a plurality of switches of the wireless communication network, based on the mobile station identifier; and
routing of the SMDPP message from the message center to the switch serving the wireless client using the obtained information.

12. The method of claim 7, wherein the routing of the second SMS message through the mobile network comprises:
receiving the second SMS message over an airlink from the wireless client;
formatting the second SMS message as a SMS Delivery Point-To-Point (SMDPP) message;
routing the SMDPP message to a message center in response to the mobile station identifier;
based on the SMDPP message, formulating a Short Message Peer-to-Peer Protocol (SMPP) message containing data from the second SMS message; and
routing the SMPP message to a gateway server, for the transmission to a server hosting the machine-to-machine application.

13. In a mobile network providing wireless communication services, an improvement facilitating machine-to-machine communications via a short messaging service (SMS) of the network, the improvement comprising:

a machine-to-machine gateway providing a network interface, for receiving first data messages from and sending second data messages to a machine-to-machine application, the first data messages containing mobile station identifiers of wireless clients as destination addresses and the second data messages containing mobile station identifiers of the wireless clients as source identifiers, wherein each mobile station identifier is assigned to a respective wireless client by an operator of the mobile network and is not a valid telephone number for routing through the mobile network;

a message center in packet communication with the machine-to-machine gateway, for:

(a) receiving the first data messages from and sending the second data messages to the machine-to-machine gateway, and (b) forwarding the first data messages through the mobile network for delivery to the wireless clients as first SMS messages based on the respective mobile station identifiers and for receiving first SMS messages for the second data message through the mobile network from the wireless clients; and a home location register coupled to the message center, for providing information regarding point of attachment of each of the wireless clients to the wireless communication network based on the respective mobile station identifiers, for use in the forwarding of the first data messages to wireless clients, wherein:

a destination address field of each first SMS message, for a valid telephone number normally required for SMS message routing through the mobile network, is empty or contains a null value, and a source address field of each second SMS message, for a valid telephone number, is empty or contains a null value.

14. The method of claim 1, wherein the machine-to-machine application and the machine-to-machine device are for one or more of: a meter reading application, an alarm application and a telemetry application.

15. The method of claim 1, wherein the wireless client associated with the automated machine-to-machine device has no valid telephone number assigned by the operator of the mobile network not for routing through the mobile network.

16. The method of claim 4, wherein the machine-to-machine application and the machine-to-machine device are for one or more of: a meter reading application, an alarm application and a telemetry application.

17. The method of claim 4, wherein the wireless client associated with the automated machine-to-machine device has no valid telephone number assigned by the operator of the mobile network not for routing through the mobile network.

18. The method of claim 7, wherein the machine-to-machine application and the machine-to-machine device are for one or more of: a meter reading application, an alarm application and a telemetry application.

19. The method of claim 7, wherein the wireless client associated with the automated machine-to-machine device has no valid telephone number assigned by the operator of the mobile network not for routing through the mobile network.

* * * * *